Dec. 24, 1957  F. MATSON  2,817,190
PLANT SUPPORT
Filed Aug. 24, 1953

Fred Matson
INVENTOR.

BY *[signatures]*
Attorneys

United States Patent Office 2,817,190
Patented Dec. 24, 1957

2,817,190
PLANT SUPPORT
Fred Matson, Hollywood, Calif.
Application August 24, 1953, Serial No. 375,909
1 Claim. (Cl. 47—47)

This invention relates to a plant support adapted to be secured to a flower pot which is highly attractive in appearance and which is especially adapted to support growing plants.

The primary object of this invention resides in the provision of a plant support which may be readily and easily detachably secured to the upper portion of a flower pot of conventional design.

Conventional flower pots are provided with an outwardly offset upper peripheral rims which are somewhat decorative in nature while being especially adapted for stacking the flower pots when they are not in use. The construction of this invention features a shaft having a bifurcated lower end provided with fingers of such construction as to resiliently clampingly engage the flower pot, the fingers being supported about the peripheral rim.

An additional feature of the invention resides in the provision of outwardly flared seat portions formed adjacent the bifurcated fingers thereby providing means for holding the plant support and adjusting it in a substantially vertical position. Perpendicular arms are integrally formed with the shaft and are constructed in their arcuate shape in order to reduce any unnecessary and unwarranted projections which may prevent the entire assembly being seated in a particularly desired location, the arcuate shape of the arms being also advantageous inasmuch as a greater portion thereof will be near the center of the flower pot and hence closer to the plant to be supported.

Still further objects and features of the invention reside in the provision of a plant support that is capable of being integrally moulded out of any resilient and suitable material such as a synthetic plastic resin or the like and which is relatively inexpensive to produce.

These, together with the various ancillary objects and features of the invention which will become apparent as the following description proceeds, are attained by this plant marker, a preferred embodiment of which has been illustrated in the accompanying drawings, by way of example only, wherein.

Figure 1:
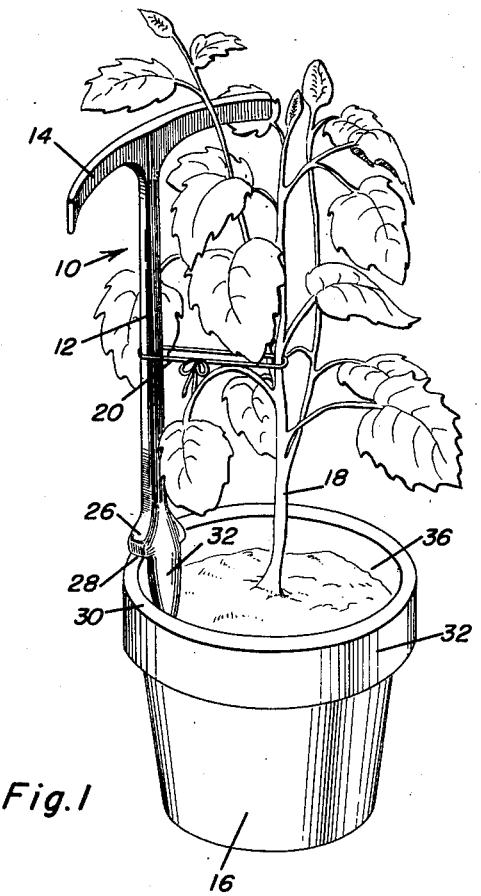
Figure 1 is a perspective view showing the plant marker comprising the present invention in operative placement on a flower pot.
Figure 2:
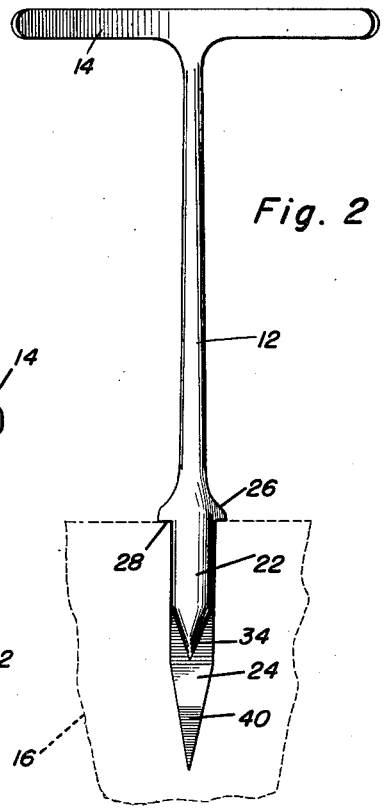
Figure 2 is a front elevational view of the plant marker.
Figure 3:
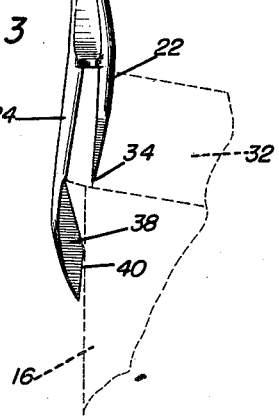
Figure 3 is a side elevational view of the plant marker showing in detail the manner in which the resilient fingers grasp and engage the upper peripheral rim of the flower pot.
Figure 4:
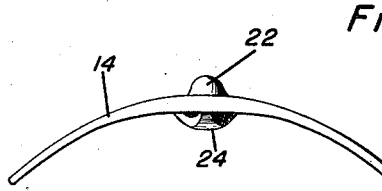
Figure 4 is a top plan view of the plant marker comprising the present invention.

With continuing reference to the accompanying drawings wherein like numerals designate similar parts throughout the various views, reference numeral 10 generally designates the plant marker comprising the present invention. The plant marker 10 includes a shaft 12 which may be moulded integrally with the other elements of the invention from any suitable plastic material such as any of the commercially available synthetic plastic resins. The shaft 12 has at the upper portions thereof one or more arms 14 which are arcuate in shape so as to be more readily encompassed by a plant growing in the flower pot 16. Depending upon the size of the flower pot 16 used and the size of the plant 18 growing therein the number of arms can be selected for an optimum amount of support. The plant 18 is primarily supported by the engagement of the limbs and branches thereof with the arms 14. However, if desired, a tie string as at 20 which may be in the form of a ribbon or the like may be utilized in aiding the support of the plant 18. The shaft 12 has the lower end thereof bifurcated to form first and second fingers 22 and 24 respectively. The shaft 12 also includes an outwardly flared seat portion 26 adjustable to the bifurcated end forming the fingers 22 and 24. This seat portion 26 provides a substantially horizontal surface 28 for engaging the upper edge 30 of the offset peripheral rim 32 of the flower pot 16. When the lower edge 28 of the seat portion 26 is held against the upper edge 30 of the peripheral rim 32, the shaft 12 will automatically attain a substantially vertical position.

The first finger 22 is pointed in shape and terminates in a point 34. The first finger 22 is also of a generally tapering shape so that the point 34 thereof may be readily and easily inserted into the soil 36 within the flower pot 16. The second finger 24 extends substantially beneath the first finger 22 and is of a resilient construction. The finger 24 has a lower cam portion 38 terminating in a cam surface 40 which is adapted to slidably engage the upper end of the peripheral rim 32 while the entire plant support is being positioned over the flower pot 16. The cam surface 40 continuously engages the outer surface of the flower pot and between the finger 22 and the finger 24 the upper peripheral rim 32 of the flower pot 16 is clampingly held. Inasmuch as the plant support is of resilient construction due to the materials used therein, the plant support shaft 12 will be clampingly held in a vertical position on the flower pot providing adequate and needed support to the plant growing therein.

Since from the foregoing the construction and advantages of this plant support are readily understood, further description is believed to be unnecessary. However, since numerous modifications will readily occur to those skilled in the art, it is not desired to limit the invention to the exact construction shown and described, and accordingly all suitable modifications and equivalents may be resorted to, falling within the scope of the appended claim.

What is claimed as new is as follows:

A plant support for use in combination with a flower pot having a peripheral upper rim offset from the body of said flower pot comprising a vertically extending shaft, at least one arm integral with the upper portion of said shaft, the lower end of said shaft being bifurcated, said bifurcated lower end including a first depending finger adapted to engage the inner surface of a flower pot, said first depending finger being tapered and having a pointed lower end, and a second depending finger directly opposed to said first finger and extending below said first finger adapted to engage the flower pot below the peripheral rim thereof, said second finger having an inwardly extending cam portion having a cam surface, said plant support being constructed of a resilient material whereby said first and second fingers will resiliently clampingly engage a flower pot therebetween, said shaft having an outwardly flared seat portion adjacent said bifurcated end forming a seat for reception of the uppermost edge of a flower pot.

References Cited in the file of this patent
UNITED STATES PATENTS

| | | |
|---|---|---|
| 500,140 | Kruger | June 27, 1893 |
| 548,508 | Bjelland | Oct. 22, 1895 |
| 796,214 | Hughes | Aug. 1, 1905 |
| 912,472 | Hart | Feb. 16, 1909 |
| 1,942,975 | Polgar | Jan. 9, 1934 |

FOREIGN PATENTS

| | | |
|---|---|---|
| 374,634 | Great Britain | June 16, 1932 |